(12) United States Patent
Krebs (10) Patent No.: US 6,907,845 B2
(45) Date of Patent: Jun. 21, 2005

(54) BOILER IMPROVEMENTS WITH OXYGEN-ENRICHED COMBUSTION FOR INCREASED EFFICIENCY AND REDUCED EMISSIONS

(75) Inventor: William P. Krebs, Winnetka, IL (US)

(73) Assignee: Krebs & Sisler L.P., Winnetka, IL (US)

( * ) Notice: Subject to any disclaimer, the term of this patent is extended or adjusted under 35 U.S.C. 154(b) by 0 days.

(21) Appl. No.: 10/887,003

(22) Filed: Jul. 7, 2004

(65) Prior Publication Data

US 2004/0237909 A1 Dec. 2, 2004

Related U.S. Application Data

(63) Continuation of application No. PCT/US03/032402, filed on Oct. 14, 2003.
(60) Provisional application No. 60/422,601, filed on Oct. 30, 2002.

(51) Int. Cl.[7] .................................................. B09B 3/00
(52) U.S. Cl. ........................ 122/7 R; 122/4 D; 110/204; 110/216; 110/234; 110/345; 60/670
(58) Field of Search .............................. 122/7 R, 4 D, 122/7 C, 7 D; 237/8 B, 9 R, 58; 60/653, 670; 110/204

(56) References Cited

U.S. PATENT DOCUMENTS

| | | | | |
|---|---|---|---|---|
| 4,355,601 A | * | 10/1982 | Hattiangadi | 122/4 D |
| 4,542,114 A | * | 9/1985 | Hegarty | 502/39 |
| 4,803,958 A | * | 2/1989 | Erickson | 122/21 |
| 5,732,571 A | * | 3/1998 | Maerz et al. | 62/611 |
| 6,702,570 B2 | * | 3/2004 | Shah et al. | 431/11 |

FOREIGN PATENT DOCUMENTS

| JP | 19026 | 2/1975 |
|---|---|---|

OTHER PUBLICATIONS

Nakayama, S., et al.; "Pulverized Coal Combustion in $O_2$ / $CO_2$ Mixtures on a Power Plant for $CO_2$ Recovery"; *Energy Convers. Mgmt*, vol. 33, No. 5–8, pp. 379–386, 1992; 1992 Pergamon Press Ltd, Great Britain.

* cited by examiner

Primary Examiner—Gregory Wilson
(74) Attorney, Agent, or Firm—Fitch, Even, Tabin & Flannery (57) ABSTRACT

A method and apparatus to conduct $O_2/CO_2$ combustion or oxygen-enriched combustion. The boiler exhaust gas passes through a Gas Primer Sector (GPS) combined with the boiler to effect heat transfer to the combustion gas in indirect counter-flow heat exchange. Sharply reduced gas flows result from using largely moisture-free $CO_2$ as diluent for $O_2$ in the combustion gas which allows long residence time at low velocity for maximum heat transfer from the exhaust gas to the combustion gas. Most particulate drops out and most moisture is condensed from the cooled mostly $CO_2$ exhaust gas. The larger portion is blended with oxygen for the combustion gas and reheated and returned to the boiler through the integrated GPS; the smaller portion is cleaned and separated, the $CO_2$ released or recovered. The complete exhaust gas-combustion gas cycle may be 30 to 90 seconds and preferably about 60 seconds. The high heat capacity of $CO_2$ allows a much higher oxygen content in the combustion gas compared to open-cycle air combustion with a large nitrogen content of lower heat capacity. Efficiency is increased. Final exhaust gas separation and recovery is simplified. Condensate is processed to boiler feedwater or potable water quality. $NO_x$ is eliminated, mercury fume captured and $CO_2$ output reduced.

21 Claims, 2 Drawing Sheets

Figure 1

Prior Art

GRF = Gas Recirculation Fan

Figure 2

Prior Art

BOILER IMPROVEMENTS WITH OXYGEN-ENRICHED COMBUSTION FOR INCREASED EFFICIENCY AND REDUCED EMISSIONS

This application is a continuation of International Application No. PCT/US03/032402 filed Oct. 14, 2003 which claims priority from U.S. Provisional Application Ser. No. 60/422,601, filed Oct. 30, 2002.

FIELD OF THE INVENTION

This invention relates to a method and apparatus integrated with a boiler for recovering sensible and latent heat from hot exhaust gas in heat exchange with cooled exhaust gas blended with oxygen for fuel combustion. The method allows the flexibility to burn virtually any fuel using oxygen-enriched air or pure oxygen and mostly $CO_2$ mixtures while recovering fuel sulfur as liquid $SO_2$. Highest efficiency is attained in 100% $O_2/CO_2$ combustion.

BACKGROUND OF THE INVENTION

References of Interest

U.S. Patents

U.S. Pat. No. 4,354,925 October 1982 Schorfheide
U.S. Pat. No. 4,542,114 September 1985 Hegarty
U.S. Pat. No. 5,732,571 March 1998 Maerz et al.
U.S. Pat. No. 6,202,574 March 2001 Liljedahl et al.
U.S. Pat. No. 6,418,865 July 2002 Marin et al.

Foreign Patent

Japanese Patent No. 50-19026 June 1973

Publications

*The Steam Engine*, D. Lardner; A. Hart, Philadelphia 1852, pp.73–79; First Edition London, 1827.

Argonne National Laboratories:

A. "Two-Dimensional Modeling of Fossil-Fueled Power Plant Behavior When Using $CO_2$—$O_2$ or $CO_2$—$H_2O$—$O_2$ Mixtures, Instead of Air, to Support Combustion," Richter et al,
June 1987, ANL/CNSV-TM-187.

B. "An Experimental Program to Test the Feasibility of Obtaining Normal Performance from Combustion Using Oxygen and Recycled Gas Instead of Air,"
ANL/CNSV-TM-204, Abele et al, December 1987.

C. "Carbon Dioxide from Flue Gases for Enhanced Oil Recovery," ANL/CNSV-65, Sparrow and Wolsky et al,
June 1988.

"Final Report on $CO_2$ Recovery from Power Plants." U.S. Department of Energy, DOE/ER 30194, July 1993.

"Pulverized Coal Combustion in $O_2/CO_2$ Mixtures on a Power Plant for $CO_2$ Recovery," Nakayama et al, *Energy Conversion and Management*, Vol. 33, pp. 379–386, 1992.

"Experimental Studies on Pulverized Coal Combustion with Oxygen/Flue Gas Recycle for $CO_2$ Recovery," Kimura et al, JSME-ASME International Conference on Power Engineering, Vol. 1, pp. 487–492, Tokyo, September 1993.

"The Characteristics of Pulverized Coal Combustion in $O_2/CO_2$ Mixtures for $CO_2$ Recovery," Kimura et al, *Energy Conversion and Management*, Vol. 36, pp. 805–808, 1995.

"Thermodynamic Availability Analysis for Maximizing a System's Efficiency," T. C. Vogler and W. Weissman, *Chemical Engineering Progress*, pp. 35–42, March 1988.

"Availability Analysis of Combustion Flue Gases-A Case Study," M. Abu-Arabi and A. Tamimi, *Energy Conversion and Management*, Vol. 36, pp. 1133–1137, 1995.

*The Entropy Law and the Economic Process*, N. Georgescu-Roegen, Harvard University Press, 1971.

"What Is Heat?" G. P. Beretta and E. P. Gyftopoulos, *American Society of Mechanical Engineers*, Vol. 20, pp. 33–41, 1985.

"Fundamentals of Analyses of Processes," E. P. Gyftopoulos, *Energy Conversion and Management*, Vol. 38, pp. 1525–1533, 1997.

Oxygen enrichment of air combustion and oxygen/carbon dioxide ($O_2/CO_2$) combustion have been studied by researchers as means to provide a greater concentration of $CO_2$ in the exhaust gas. The higher concentration would allow a more economical method of recovering $CO_2$ for sequestration, should this become necessary due to global warming of the atmosphere chargeable to excessive $CO_2$ buildup. See particularly Patent No. 50-19026, Japan, 1973; Argonne National Laboratories research, Richter et al, 1987 and Abele et al, 1987; and Nakayama et al, 1992. Coal-fueled power plants are considered to be at risk because their emissions generally consist of 12% to 15% $CO_2$ versus about 7% to 8% for gas-fueled plants when compared at similar efficiencies, for example a 10,000 Btu (10,550 kJ) heat rate per net kilowatt (kw) of power output, an efficiency of 34%. Most studies have concluded that oxygen enrichment of air combustion or $O_2/CO_2$ combustion is not economical due to the high cost of purchased and delivered oxygen. Alternatively, including an air separation plant requires a relatively high capital cost and the electric power load is about 225 kw of power per ton of oxygen or approximately 20% of the total output of a 10,000 Btu (10,550 kJ) heat rate plant, using 97% to 100% purity oxygen with recycled mostly $CO_2$ exhaust gas as the diluent for fuel combustion. Along with other auxiliary power requirements, total parasitic power can be 25% if both $CO_2$ and sulfur dioxide ($SO_2$) are completely separated and liquefied for shipment or disposal, $CO_2$ going into an underground reservoir, for example.

Figure 1:
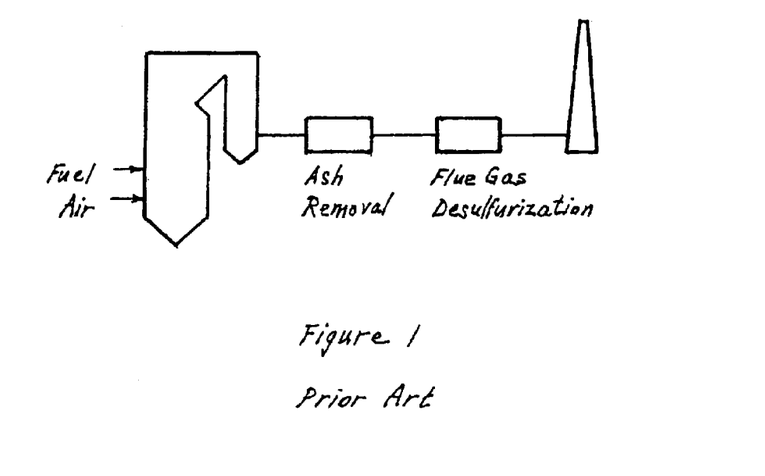
FIG. 1 is a schematic view of a state-of-art air-fired boiler system with flue gas cleaning processes.
Figure 2:
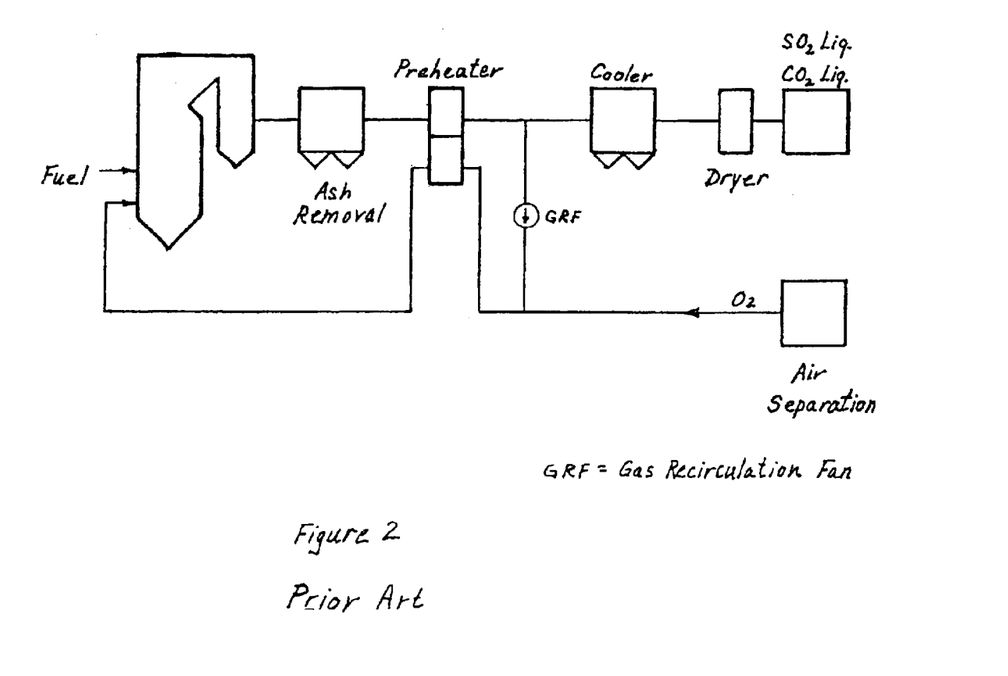
FIG. 2 is a schematic view of an $O_2/CO_2$—$H_2O$-fired boiler system with exhaust gas cleaning processes and with $SO_2$ and $CO_2$ liquids recovery, according to Nakayama et al., 1992.

Research on $O_2/CO_2$ combustion in Japan, as illustrated in FIG. No. 2, resulted in identifying an efficiency gain of 4.5% by wet recycling a $CO_2$—$H_2O$-rich exhaust gas through the boiler as diluent and excluding nitrogen ($N_2$), which improvement is considered due to the greater density of $CO_2$ compared to $N_2$. Less diluent for $O_2$ is needed when substituting $CO_2$ for $N_2$. However, the improvement has not been enough to justify commercialization of the technology.

Marin et al. in U.S. Pat. No. 6,418,865, for a Method For Operating A Boiler Using Oxygen-Enriched Oxidants, show data which indicate limited efficiency improvement from oxygen enrichment. The efficiency improvement is similar to the 4.5% gain found by Nakayama et al., 1992. This gain must be limited by the high moisture content in the recirculated flue gas, which has the adverse effect of increasing gas velocity through the boiler; also to system heat losses through the convection sector of the boiler and air heater and ducting; to heat losses in the processes of ash removal and flue gas desulfurization; and also due to large sensible and latent heat losses in the flue gas exhausted to the atmosphere.

The advantage claimed by Marin et al depends on the relative costs of fuel and oxygen. High cost fuel saved by low cost oxygen enrichment may yield an economic benefit. Low cost fuel and high cost oxygen enrichment may yield little or no advantage because the total efficiency improvement potential in Marin is only 4 to 5%.

The Argonne National Laboratories and Kimura et al references are instructive for elimination of $NO_x$ in $O_2/CO_2$ combustion where, due to keeping most nitrogen out of the fuel combustion process, little $NO_x$ can form; and further, these studies show that any $NO_x$ formed as NO and $NO_2$ is about 90% eliminated by reduction to $N_2$ by the effect of "reburning" during the continuous recirculation of most exhaust gas as diluent for oxygen. The present invention goes further by virtually eliminating trace $NO_x$ due to gas cooling and condensing $NO_2$ as dilute nitric acid.

The Maerz et al patent, U.S. Pat. No. 5,732,571, is instructive for $O_2/CO_2$ combustion regarding the amount of exhaust gas circulated, explaining that "approximately 80% of the flue gas employed as a substitute for the nitrogen in the air is no longer generated as exhaust gas" and therefore "it is possible to achieve a drastic reduction of the volume of flue gas to as low as 20% of the present value" compared to state-of-art plants. Patent No. 50-19026 (Japan 1973) also discloses this 80% reduction. The present invention further reduces, by half, the amount of exhaust gas for final treatment, to 10% or less, in the doubling of plant efficiency from about 34% to 68% or more, by employing the method and apparatus disclosed hereinafter.

In the preferred method of operation of state-of-art air-fired boilers, 10% to more than 20% excess air over the stoichiometric air requirement for fuel burning is utilized for temperature control and to assure good fuel burnout. The fuel penalty for excess air heating can be eliminated in $O_2/CO_2$ combustion. About a 1% excess oxygen input is substituted for excess air. Combustion gas volume and space velocity are both reduced, which factors contribute to increased efficiency.

Research to find the economical and efficient $O_2/CO_2$ combustion method underlying this invention has focused on attempting to measure total heat availability and also to determine the means to return known and estimated heat losses to the boiler to improve efficiency; then employing $O_2/CO_2$ combustion to improve fuel burning and exhaust gas separation processes after recycling all heat in an ideal plant. The result is now found to be a state-of-art boiler without size reduction or enlargement but with most facilities removed after the superheater, which are replaced with an extension of the boiler called the Gas Primer Sector (GPS).

Sensible heat losses. Much sensible heat of combustion is wasted at several process points in state-of-art steam power plants. These losses may be 30% to 45% of the total fuel energy input. Losses are due to several factors including very high exhaust gas velocity through the radiant and convective heat transfer sectors of the boiler, 60 to 70 feet per second (fps) (18–21 mps); also to air leakage, heat radiation and insufficient insulation, and to the need to avoid corrosion at condensing temperatures. These problems are addressed in achieving this invention. Presently wasted sensible heat is virtually all recovered and returned to the boiler in the combustion gas.

Boiler moisture and latent heat losses. In the year 1763, James Watt made two discoveries which led to his development of the first efficient and economical steam engine. First he measured the expansion of water converted to steam at 212° F. (100° C.) and found that one cubic inch of water expanded to one cubic foot of steam, an expansive force of 1,728 times; and second, he discovered and measured the high latent heat of water, which force he also exploited to improve efficiency. These forces were later significant in the development of steam turbine power. They are the principal factors underlying the inefficiency problems solved by utilizing the method and apparatus disclosed hereinafter. Water-to-steam expansion is essential on the steam side of the boiler tubing where pressure is developed to turn the turbine to provide power. But on the combustion-and exhaust side of the boiler tubing, fuel moisture and combustion air moisture plus fuel hydrogen oxidized to $H_2O$ cause conditions detrimental to efficiency: first by raising the velocity of gases passing through the boiler, thus reducing residence time for fuel combustion and for radiant heat transfer through the tubing; and second, because state-of-art boilers are operated to exhaust flue gases at above 212° F. (100° C.) and more generally at 240–450° F. (116–232° C.) to avoid acid gas corrosion at condensing temperatures. All latent heat of vaporization/condensation is lost, wasted to the atmosphere. Depending on the fuel burned, whether natural gas, oil, coal, petroleum coke, lignite or a synthetic fuel, and depending on the air moisture content, latent heat losses may be 7% to 15% of the fuel energy input. My improved method and apparatus embody the means to recover most of the latent heat to increase efficiency.

Wet scrubbing processes have been developed which are capable of removing sulfuric acid and most $SO_2$ from flue gas. The stack gas temperature for emission may be less than 212° F. (100° C.) if corrosion-resistant materials are used for ducting and to line the stack. However, a large amount of sensible heat and all latent heat is absorbed in the alkaline scrubbing slurry and is not recoverable to improve combustion efficiency.

Combined-cycle power generation. Water-to-steam expansion has been important in raising the efficiency of aeroderivative turbines in combined-cycle systems where a turbine plus a heat recovery steam generator (HRSG) are now able to achieve better than 50% efficiency. An important efficiency gain came from reducing the approximately 300% excess air requirement of the turbine by partial substitution of water or steam. A greater expansive force results from the substitution because water vapor has approximately a 60% greater space requirement than air (see Table 1, $H_2O$:Air, cu ft/lb). The >50% combined-cycle efficiency is an important improvement versus single-cycle turbine-only power generation. However, much high-purity water is required, all lost to the atmosphere along with all fuel combustion condensate. Also, the very high velocity of the turbine exhaust gas flowing through the HRSG limits useful heat recovery so that much sensible heat and all latent heat is lost to the atmosphere. Combined-cycle power generation generally requires a $NO_x$ reduction catalyst which has high operating costs. Compare the combined-cycle combustion method with the technology described hereinafter which has no need for catalysts, which is a net producer of water by recovering and processing all condensate, which should have a higher efficiency, and which is not restricted to natural gas or a clean syngas as operating fuel.

The efficiency improvements found in the research for this invention are due to many factors. The key was finding an economical way to remove most of the moisture from the exhaust gas to allow the heat transfer advantages of the $O_2/CO_2$ combustion method to become obvious. This will be apparent from examination of Table 1 that appears hereinafter. If gas velocities, both combustion gas and exhaust gas, are sufficiently reduced, complete fuel burn-out is attainable and better heat transfer is achieved in longer boiler residence time. Adding the insulated GPS to the boiler provides the means to recover the remaining sensible heat and most latent heat by indirect counterflow heat exchange of outflowing exhaust gas with inflowing $O_2/CO_2$ combustion gas in a long residence time, 15 to 45 seconds or more. If $CO_2$ is substituted for $N_2$ as the diluent for oxygen in fuel combustion, $O_2$ concentration can be increased more than 60% due to $CO_2$ having a density and heat capacity 63% greater than $N_2$. Schorfheide, in U.S. Pat. No. 4,354,925, explains that over a temperature range of 800 to 980° F. (427–527° C.) (for coke burning to regenerate a catalyst), "carbon dioxide has an average heat capacity 63 percent greater than that of nitrogen (12.1 Btu/lb mol-° F. for $CO_2$ versus 7.43 Btu/lb mol-° F. for nitrogen) . . . carbon dioxide will absorb roughly 63% more heat than an equivalent volume of nitrogen at corresponding temperatures." Also "the concentration of oxygen can be about 63 percent greater in the case of complete carbon dioxide" and this $O_2/CO_2$ mixture "reduces burn time by a full 33 percent."

If the exhaust gas is cooled to ambient or below in an extended residence time, nitrogen oxide (NO) will oxidize to nitrogen dioxide ($NO_2$) in a slight excess of $O_2$ (see Hegarty, U.S. Pat. No. 4,542,114) and will convert to nitric acid ($HNO_3$) and drop out as condensate. Sulfur trioxide ($SO_3$) will convert to sulfuric acid ($H_2SO_4$) and also drop out as condensate. If most moisture is condensed, blower power to move the much drier, cool exhaust gas is reduced. Blower power to move cool recycled combustion gas is also reduced. If a relatively dry <1% moisture content $O_2/CO_2$ combustion gas is then reheated and returned to the boiler, the velocity of the combustion gas through the boiler is sharply decreased.

$CO_2$ has a much greater density than $H_2O$. $CO_2:H_2O=44:18=2.44$ or $CO_2$ has 244% of the density and sensible heat capacity of $H_2O$ as water vapor by mol wt. In the wet recycle $O_2/CO_2$—$H_2O$ method, the exhaust gas is returned to the boiler with no moisture reduction which has the undesired effect of reducing heat capacity and sharply raising velocity. This reduces combustion gas residence time which impairs radiant heat transfer through the boiler heating surfaces. The velocity problem in the wet recycle method obscures most of the efficiency improvement opportunity related to substituting denser $CO_2$ for $N_2$ as diluent.

If a vacuum removal method can be utilized to take out particulate in a low velocity non-turbulent laminar flow heat exchange duct, no electrostatic precipitator (ESP) or baghouse is needed. If heavy insulation can be economically used to retain heat for exchange in a duct system with a low velocity combustion gas flow of blended $O_2$ and $CO_2$, then virtually 100% of the so-called waste heat lost in state-of-art combustion systems can be returned to the boiler. If most sensible and latent heat can be recycled to benefit fuel combustion, the plant fuel requirement, the oxygen requirement, the plant parasitic power requirement and the $CO_2$ output may all reduce by half; and potentially more than half since most state-of-art air-fired steam generation power plants operate at net efficiencies of only 33% to 35%.

If the final exhaust gas of the $O_2/CO_2$ combustion process is cooled to ambient temperature or below, the volume for cleanup and separation will be less than 10% of the hot flue gas output from a state-of-art air-fired steam power plant. Gas separation and the recovery of constituents will be economical by known means. Corrosion in the condensing region is not a disabling problem due to the development and proven reliability of superaustenitic stainless steels. Condensate may be recovered and processed to boiler feedwater or potable water quality. Trace mercury fume is captured in a filter by activated carbon or other known sorbents. $SO_2$ is recovered as a refrigeration-grade liquid for chemicals production or feedstock to a sulfuric acid plant. If a sulfuric acid plant is added, the particulate recovered from fuel combustion can be chemically processed in an acid-leaching treatment for metals recovery and upgrading of the remainder particulate.

The foregoing discussion considers most of the changes necessary to maximize efficiency in $O_2/CO_2$ combustion with 97% to 100% pure oxygen, which changes have been incorporated into the preferred embodiments described in detail hereinafter.

*Partial oxygen enrichment of air combustion.* Air combustion with oxygen enrichment, in a boiler combined with the GPS and with moisture mostly removed from the recycled exhaust gas, has been studied. 30% or more enrichment will provide good efficiency improvement compared to complete air combustion but less than with pure oxygen. This is because of the added nitrogen and also due to air moisture of several percent which varies with ambient air conditions. By increasing the amount of lower density nitrogen displacing $CO_2$ in the recycling of exhaust gas to the boiler and by the addition of air moisture, gas flow volume and velocity are increased and therefore reduce residence time for heat transfer, lowering efficiency below complete $O_2/CO_2$ combustion.

*Air combustion of clean fuels.* Combining the GPS with a boiler allows air combustion of clean fuels with only trace $NO_x$ in the emission. Efficiency is improved compared to state-of-art air-fired combustion steam generation plants. This is a once-through process with no exhaust gas recycling which uses the heat exchange method and apparatus of the GPS to condense most moisture and increase waste heat recovery. The exhaust gas temperature is reduced to about 40° F. (4° C.). The presence of an excess of oxygen at this reduced temperature with an extended residence time provides the conditions to convert NO to $NO_2$ which then is recovered as dilute nitric acid ($HNO_3$) condensate. The final exhaust gas will contain less than 1% moisture in a mixture of mostly $N_2$, $CO_2$ and $O_2$. Condensate may be treated to boiler feedwater or potable water quality.

SUMMARY OF THE INVENTION

Rankine cycle steam power plants may be adapted to a high efficiency and low emission combustion method by replacing most facilities after the superheater. The economizer section is reconfigured. Eliminated are the air heater, ESP or baghouse, and flue gas desulfurization (FGD) by scrubbing, all three of which dissipate heat, most of which is now recovered by the improved method and apparatus disclosed hereinafter.

Highest efficiency will be attained in a combustion gas atmosphere of a largely moisture-free mixture of pure oxygen and carbon dioxide.

A GPS is combined with a boiler to reduce the exhaust gas temperature, velocity, particulate and moisture. The exhaust gas temperature is reduced to ambient or below while the return flow combustion gas temperature is raised from ambient. Integration of the GPS with the boiler makes possible the maximum preheating of an optimally controlled mixture of $O_2$ and $CO_2$ combustion gas.

The exhaust gas and the combustion gas flows are through corrosion-resistant outer and inner superaustenitic stainless steel ducts. Most particulate in the exhaust gas drops out in the reduced velocity non-turbulent laminar flow for vacuum removal. The ducts are sized to provide an extended residence time for both the combustion gas and exhaust gas flows. The low velocity and laminar flow of the exhaust gas will beneficially promote the van der Waals force effect, which is the coalescing and agglomeration of fine particles; and the slow gas flow will benefit particulate settling by the force of gravity.

Hydrocarbon fuels may contain up to several percent sulfur and 1% nitrogen. These elements oxidize during combustion and in the presence of $H_2O$ they are the source of acidic moisture. Most acidic moisture is condensed; trace sulfur trioxide ($SO_3$) condenses as dilute sulfuric acid ($H_2SO_4$) and trace nitrogen oxide (NO) converts to nitrogen dioxide (NO2) and condenses as dilute nitric acid ($HNO_3$). Other trace acids, hydrochloric (HCl) and hydrofluoric (HF) may be present depending on the fuel and will also condense.

Most exhaust gas is recirculated to the boiler blended with oxygen to comprise the fuel combustion gas via one or more return ducts within the insulated GPS for nearly 100% recovery of sensible heat and recovery of most latent heat, to reduce the fuel and oxygen consumption of the combustion process. Exhaust gas may also be ducted back to the boiler and reheated via the GPS for attemperation duty and also to convey pulverized or crushed or shredded fuels into the boiler.

The preheated largely moisture-free and mostly $O_2$ and $CO_2$ combustion gas with low excess $O_2$ (no greater than about a 3% excess and preferably about 1% excess of stoichiometric) allows a low velocity of 20 to 30 fps (6–9 mps) through the boiler and therefore a long fuel combustion residence time with much greater heat conduction compared to high velocity 60 to 70 fps (18–21 mps) air-fired boilers usually operated with 10% to 20% or more excess air. Operation of the boiler for temperature control with a well modulated mixture of relatively dry (<1% moisture) $O_2/CO_2$ combustion gas at 20 fps (6 mps), versus 60 fps (18 mps) for open-cycle air combustion, triples fuel combustion and heat transfer time. Furthermore, combustion in an $O_2/CO_2$ gas mixture versus air combustion at the same temperature reduces burn time by 33% due to the greater density and heat capacity of $CO_2$ compared to $N_2$. The sum of these two advantages approximately quadruples the net effective radiant heat transfer time in the boiler. These fuel combustion conditions, together with the nearly complete heat recovery achieved by combining the GPS with the boiler, explain most of the previously unpredictable high efficiency of this $O_2/CO_2$ combustion system.

The remainder exhaust gas not recirculated to the boiler is ducted at ambient temperature to be further processed by known means to condense and remove any remaining acidic moisture. The mildly acidic condensate is processed by known means to boiler feedwater or potable water quality. Remainder particulate in the exhaust gas is dry-filtered. Mercury fume carried over from the fuel is captured in a filter by activated carbon or other known sorbents. The exhaust gas is further processed to liquify $SO_2$ and then may be processed to liquify $CO_2$ with any trace $N_2$ and $O_2$ vented to the atmosphere. Sulfur-free fuels require fewer processing steps.

Boilers integrated with the GPS may be operated with partial oxygen enrichment of air to obtain an efficiency improvement with reduced emissions. 30% or greater enrichment is preferred to keep nitrogen at moderate levels. Too much $N_2$ adversely affects both combustion gas and exhaust gas volume, velocity, residence time and heat transfer.

Boilers integrated with the GPS may also be operated without oxygen enrichment of air when firing natural gas or sulfur-free synthetic fuels and will deliver improved efficiency with very low nitrogen oxides ($NO_x$) in the emission because moisture condensation traps virtually all $NO_x$ as dilute $HNO_3$ in the recovered condensate.

Fuels eligible for combustion in either the $O_2/CO_2$ or the oxygen-enriched method and apparatus of this invention include most refuse-derived fuel (RDF), biomass and most combustible hazardous wastes but excluding radioactive materials. The limiting factor is maintaining boiler temperature. Low Btu fuels such as RDF and biomass may be blended with coal, petroleum coke, natural gas or heavy fuel oil, for example, and boiler temperature will be controlled by adjusting the proportion of diluent to oxygen in the combustion gas. Slagging fuels can limit boiler selection. Boilers equipped with cyclone furnaces are designed for slag recovery. Fluidized bed boilers are not felt to be suited to the combustion method of this invention. In fluidized bed combustion, fuel sulfur is largely captured by sorbents such as crushed limestone. Massive solid wastes are produced. In my preferred method, sulfur recovery is accomplished by liquefying $SO_2$, a feedstock for manufacturing many chemicals including sulfuric acid. The higher capital and operating costs of fluidized bed combustion boilers are unnecessary for either $O_2/CO_2$ or oxygen-enriched air embodiments employing the method and apparatus of this invention.

The application of variable speed drive (VSD) controlled motors is preferred and has three cost-reducing functions: (1) VSD minimizes the parasitic power requirement wherever applied; (2) the process-gas flows, both exhaust gas and combustion gas flows, may be continuously optimized; and (3) applying VSD to all system-variable process flows makes possible the mostly complete automation of the combustion method and apparatus of this invention.

In one particular aspect, the invention provides a Rankine cycle steam generator system which system comprises: a boiler (1) having a fuel combustion zone (1a) and radiant heat and convective heat transfer zones (2,3) for producing steam; an insulated Gas Primer Sector (GPS) (4) combined with the boiler so that an exhaust gas stream therefrom flows through the GPS; the GPS including means (29) for removing particulate from the exhaust gas stream and means (5) for transferring heat to a combustion gas stream by indirect counterflow heat exchange with the exhaust gas stream over an extended residence time, the result of which heat transfer is the reduction of the temperature of the exhaust gas stream to a temperature where moisture condenses; means (12) for supplying said combustion gas stream to the GPS where it is heated in indirect counterflow heat exchange with the exhaust gas stream over an extended residence time to reach a temperature of at least about 500° F. (260° C.); insulated duct means (6) for conveying the heated combustion gas stream exiting the GPS to the boiler combustion zone (1a) for fuel combustion therein; and means for removing particulate from the GPS.

In another particular aspect, the invention provides a Rankine cycle steam generator system which system comprises: a boiler (1) having a fuel combustion zone (1a) and radiant heat and convective heat transfer zones (2,3) for producing steam; an insulated Gas Primer Sector (GPS) (4) combined with the boiler so that an exhaust gas stream therefrom flows through the GPS; said GPS including means (29) for removing particulate from the exhaust gas stream and means (5) for transferring heat to a combustion gas stream that includes oxygen and mostly $CO_2$ by indirect counterflow heat exchange with the exhaust gas stream over an extended residence time, as a result of which heat transfer the temperature of the exhaust gas stream is reduced to near ambient or lower so that moisture condenses; means (14) for further cooling the exhaust gas stream to between about 32 and 50° F. (0–10° C.); means (9,17) for separating the further cooled exhaust gas stream into a first major portion and a second portion; means (8, 11, 12) for combining said first portion with $O_2$ to form the combustion gas stream and for supplying same to the GPS where it is heated in indirect counterflow heat exchange with the exhaust gas stream over an extended residence time to reach a temperature of at least about 500° F. (260° C.); insulated duct means (6) for conveying the heated combustion gas stream exiting the GPS to the boiler combustion zone (1a) for fuel combustion therein; and means (29) for removing particulate from said GPS.

In a further particular aspect, the invention provides a method for operating a Rankine cycle steam generator system which system includes a boiler (1) having a fuel combustion zone (1a) and radiant heat and convective heat transfer zones (2, 3) for producing steam, and an insulated Gas Primer Sector (GPS) (4) combined with the boiler so that an exhaust gas stream therefrom flows through the GPS and wherein a combustion gas stream flows in a counterflow direction therewithin, said method comprising transferring heat to the combustion gas stream by indirect counterflow heat exchange with the exhaust gas stream over an extended residence time within the GPS, as a result of which heat transfer the temperature of the exhaust gas stream is reduced to near ambient or lower so that moisture condenses; removing particulate from the exhaust gas stream in the GPS; further cooling the exhaust gas stream to between 32 to 50° F. (0–10° C.) to condense additional moisture; separating the further cooled exhaust gas stream into a first major portion and a second portion; combining the first portion with $O_2$ to form a combustion gas stream containing $O_2$ and mostly $CO_2$ and supplying same to the GPS where it is heated in indirect counterflow heat exchange with the exhaust gas stream over an extended residence time so that it reaches a high temperature of at least about 500° F. (260° C.); conveying the high temperature combustion gas stream from the GPS through insulated duct (6) to the boiler combustion zone (1a) for fuel combustion therein and removing particulate from the GPS.

DETAILED DESCRIPTION OF THE PREFERRED EMBODIMENTS

Figure 3:
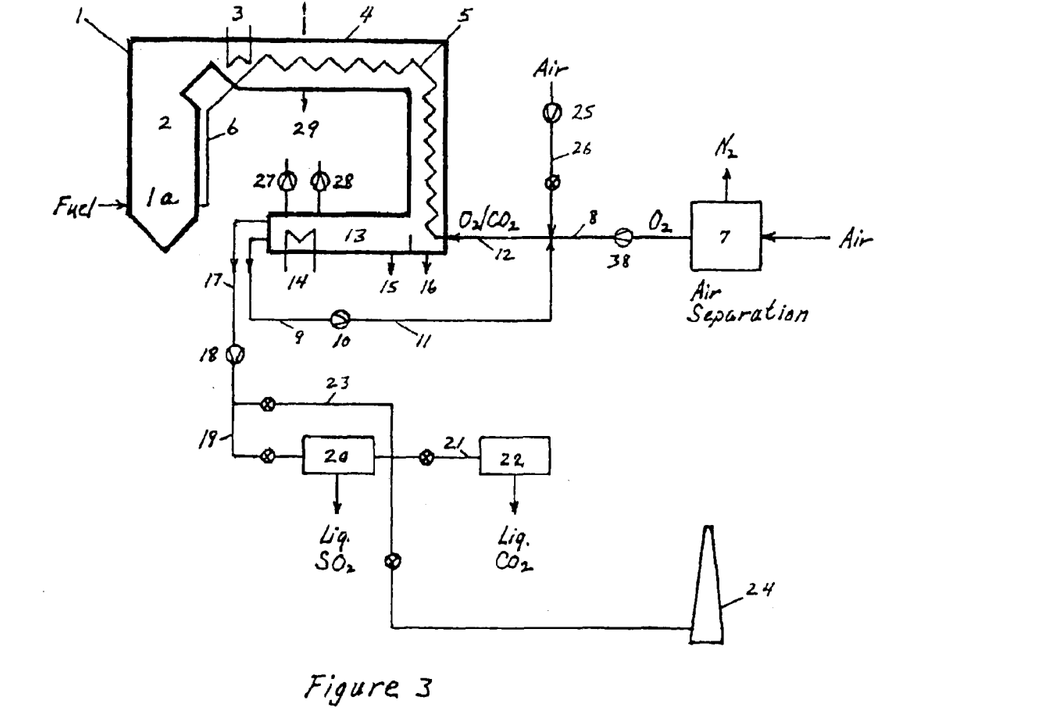
FIG. 3 is a schematic view of an $O_2/CO_2$-fired boiler system combined with a Gas Primer Sector (GPS) and with $SO_2$ and $CO_2$ liquids recovery as described in my preferred embodiments.

FIG. 3 shows a cross-sectional schematic diagram of a steam-generating boiler 1 combined with a Gas Primer Sector (GPS) 4. Boiler 1 includes a fuel combustion zone 1a, radiation zone 2 and a convection zone in the area of the boiler feedwater tubing 3. Fuel is supplied to the boiler in the lower region of radiation zone 2, and the fuel oxidant is delivered through an insulated duct 6.

The overall dimensions of the GPS are generally proportional to boiler size. For example: given a 100 MW scale state-of-art boiler designed by Babock & Wilcox, its height may be about 125 feet (38 m); the GPS may extend horizontally about 125 feet (38 m) from the top of the boiler, then downwardly about 125 feet (38 m), and again horizontally about 75 feet (23 m) in a lower gas cooling section, as illustrated in FIG. 3. A similar boiler designed for a 750 MW capability may have a height of 250 feet (76 m); the GPS may extend horizontally about 250 feet (76 m) from the top of the boiler, then downwardly about 250 feet (76 m), and again horizontally about 150 feet (46 m).

The boiler start-up oxidant may be air entering the system through blower through ducts 26 and 12. When the oxygen supply for normal closed-cycle operation of the boiler reaches the required rate, air supply duct 26 is closed. Complete $O_2/CO_2$ combustion will eventuate, as exhaust recycling continues with $O_2$ blending and the nitrogen from initial air admission is gradually winnowed from the exhaust.

Figure 4:
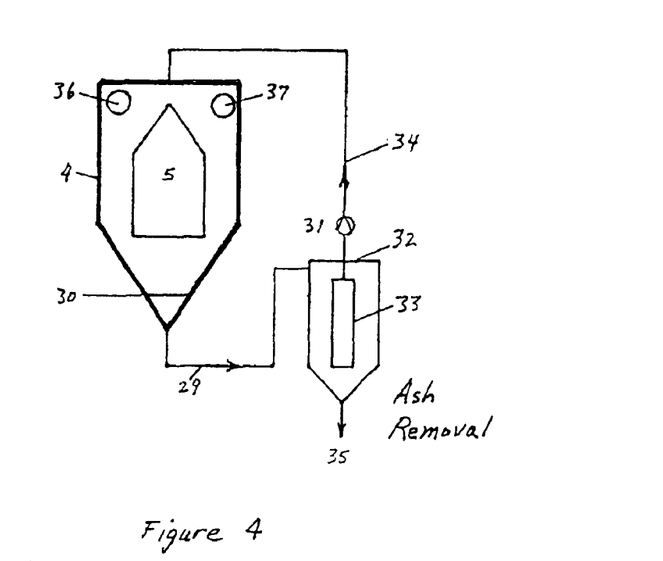
FIG. 4 is a schematic view of a cross-section of the upper ducts of the GPS at point A of FIG. 3 showing particulate recovery by vacuum blowback filters.

Boiler start-up fuel is preferred to be natural gas or a synthetic fuel to minimize the emission from open-cycle operation. This emission may include a small amount of $NO_x$ as $N_2O$ (nitrous oxide), NO and $NO_2$. The GPS 4 includes an insulated, elongated outer duct and one or more elongated inner ducts 5. As best seen in FIG. 4, the elongated interior duct is generally coaxial with the exterior duct and has a sloped upper surface to deter the accumulation of particulate. The oxidant is blown through a duct or ducts 5 interior of the insulated Gas Primer Sector 4 and then through the insulated duct 6 to the lower boiler fuel combustion zone. The duct or ducts 5 are constructed of corrosion-resistant thin-walled superaustenitic stainless steel in order to effect maximum heat transfer of outflowing exhaust gas to the inflowing oxidant combustion gas. A superaustenitic stainless such as the AL-276 metal available through Allegheny Technologies is preferred. Al-276 is corrosion-resistant to the acidic high-temperature environment of the GPS 4. This metal has a maximum operating temperature of 1000° F. (538° C.) and is therefore suited to corrosive outflowing exhaust gas conditions following the boiler feedwater heating zone 3 where the temperature will be about 800° F. (427° C.) decreasing to 70 to 120° F. (21–49° C.) at the base of the vertical section of the GPS 4. Duct 5 may be constructed on a suspended metal frame to hold in place welded stainless steel sheets of about 1/16" (0.15 cm) thickness. The thinnest sheeting which can be securely welded, to prevent leakage from the inner duct 5 combustion gas into the outer duct, is preferred so as to maximize heat transfer from the outflowing exhaust to the cooler inflowing combustion gas. AL-276 thermal conductivity is approximately 9.8 Btu's/ft$^2$/hr/° F./ft at 800° F. exhaust gas temperature, decreasing to 6.4 at 200° F. and to 5.9 Btu's at 70° F. (17 W/m/° K at 427° C., 11 at 93° C. and 10.2 at 21° C.).

The outer duct of the GPS 4 is well insulated. The insulation efficiency is preferred to exceed 90% and most preferred to be 98 to 99% efficient. Construction materials may include an insulation-grade concrete of up to three feet thickness to maximize heat retention, plus an inner liner of superaustenitic stainless steel to prevent corrosion.

Following boiler start-up, exhaust gas passes upward through the boiler radiant heat zone 2, transferring heat to the boiler tubing to produce steam. It then passes the convection zone 3 to further transfer heat through tubing for boiler feedwater heating, thereby reducing the exhaust gas temperature from about 1800–2000° F. (982–1093° C.) to about 800° F. (427° C.)at about the location of entry into the GPS 4. The GPS 4 comprises an upper generally horizontal section, an intermediate generally vertical section and a lower generally horizontal section that may be aligned below the upper section. The outflowing exhaust gas temperature gradually reduces preferably to about 200° F. (93° C.) or below at the end of the horizontal upper duct section, then further reduces to preferably about 70–120° F. (21–49° C.) at the base of the vertical duct section, more preferably to about 70° F. (21° C.). Mildly acidic moisture condenses and leaves the air-tight GPS through a collection basin and line 16. The exhaust gas is further cooled in zone 13 of the GPS that is preferably equipped with refrigerant cooling coils 14. The exhaust gas temperature is reduced to below 50° F. (10° C.) and preferably to at least about 40° F. (4° C.) to further condense acidic moisture, which leaves the system via line 15. Most remaining particulate precipitates in the condensate in the low velocity laminar gas flow of cooling zone 13.

For a short period of time during boiler start-up, the major portion of this cooled, nearly moisture-free exhaust gas is routed through a duct 9 and a blower 10, then through a duct 11 for blending with air and with some oxygen from an air separation unit 7, incoming flow of which is controlled by a blower 38 having a variable speed drive (VSD) motor that delivers the $O_2$ through duct 8. As the combustion system begins operation, such mixing of the flows from ducts 11 and 8 and some air takes place, and this combination gas mixture is routed back to the GPS through duct 12. A small stream of excess exhaust gas is routed through a duct 17 and a blower 18 through a line 23 to the stack 24.

Provided that the boiler fuel is sulfur-free natural gas or synthetic fuel, open-cycle air combustion may be continued with only minimum $NO_x$ emissions due to the exhaust cooling method of the GPS wherein NO is oxidized to $NO_2$ which cools and in the presence of trace oxygen, condenses as $HNO_3$ in an extended residence time. Efficiency is improved versus state-of-art open cycle air combustion due to the heat recovery method of the GPS.

In the most preferred method of operation, and regardless of the fuel, the boiler combined with the GPS will reach maximum efficiency with complete $O_2/CO_2$ combustion as shown in Table 1 (5), the recycled diluent being >95% $CO_2$. Air is excluded and only the nitrogen that may be present in the fuel is passing through the system. Nitrogen conversion to $NO_x$ will be extremely low and after $HNO_3$ condensation in cooling region 13, $NO_x$ may not be detectable.

TABLE I

Principal Exhaust Gas Constituents of a Pulverized Coal-Fired Boiler for Air Combustion, for $O_2/CO_2$—$H_2O$ Combustion and for $O_2/CO_2$ Combustion

| Gas | Mol. Wt.(1) | Specific Gravity | Cu. Ft. Lb.(1) | Weight Percent by Method of Combustion(2) | | |
|---|---|---|---|---|---|---|
| | | | | Air(3) | $O_2/$ $CO_2$—$H_2O$(4) | $O_2/$ $CO_2$(5) |
| $H_2O$ | 18.106 | 1.0 | 21.004 | 10.0% | 40.0% | <1.0% |
| $N_2$ | 28.106 | 1.555 | 13.46 | 72.0 | <1.0 | <1.0 |
| Air | 28.975 | 1.600 | 13.069 | — | — | — |
| $O_2$ | 32.00 | 1.776 | 11.816 | 3.0 | <2.0 | 1.0 |
| $CO_2$ | 44.00 | 2.442 | 8.593 | 15.0 | 56.0 | >95.0 |
| $SO_2$ | 64.06 | 3.556 | 5.901 | 0.25 | 1.5 | 2.5 |

(1) Compressed Air and Gas Handbook, 1988, water vapor et al at 60° F., 14.7 lb.abs.
(2) Generalized estimates. Fuel: bituminous coal, 3% sulfur.
(3) Estimated at the air heater outlet, 300° F. or more.
(4) Estimated at the flue gas recycle fan, 250–450° F.
(5) Estimated at the exit of the Gas Primer Sector (GPS), 40° F.

After fuel combustion in the radiant heat zone of the boiler, hot exhaust gases carry particulate upward and into the horizontal region of the GPS; the gas stream exiting the boiler is preferably at a velocity of about 30 fps (9 mps) or less and more preferably at about 20 fps (6 mps) or less. Here most particulate drops out in a low velocity and long residence time laminar gas flow as the hot outflowing exhaust gas cools by indirect heat exchange with the counterflowing $O_2/CO_2$ combustion gas in duct 5. The outflowing gas continues to cool as it passes downward and moisture condenses, further removing particulate in the condensate. Most remaining particulate will be captured in condensate as the exhaust gas passes through cooling zone 13 where the final exhaust gas temperature may be reduced to about 32 to 50° F. (0–10° C.), and preferably to about 40° F. (4° C.), and its velocity is reduced to about 10 fps (3.3 mps) or less. The major portion of the cooled exhaust gas (with its moisture reduced to <1%) is passed through duct 9, blower 10 and duct 11 to be blended with $O_2$; this blend flows through duct 12 at about ambient temperature and enters the interior duct or ducts 5 within the GPS. The blended $O_2/CO_2$ combustion gas is heated to 500–750° F. (260–399° C.), and preferably to at least about 700° F. (382° C.) in its indirect counterflowing, low velocity and long residence time heat exchange with the outflowing exhaust gas.

Outflowing exhaust gas residence time through the GPS 4 is preferred to be 15 to 45 seconds and more preferably at least about 30 seconds. Inflowing combustion gas residence time through the GPS 4 and duct 6 and boiler 1 is preferred to be 15 to 45 seconds and more preferably at least about 30 seconds.

In this most preferred embodiment of the method and apparatus of this invention, the excess exhaust gas that is not recycled to the boiler passes through duct 17 and blower 18, and then through a duct 19 leading to gas finishing processes, which processes are carried out by known means. The preferred means include passing the now ambient temperature exhaust gas through a compressor and a cooler to remove any remaining moisture; then passing the dry gas through a filter if desired to reduce any remaining particulate to below one micron particle is size; then passing the gas through a sorbent filter such as activated carbon to remove mercury fume if such is present; then reducing the gas temperature to at least about 70° F. (21° C.) in a unit 20 that includes a heat exchanger and recovering liquid $SO_2$ which will condense therein; and finally either passing the remainder through a duct 21 for further cooling by known means, preferably a gas/liquid heat exchanger 22, to liquify $CO_2$, or alternatively ducting the gaseous $CO_2$ through line 23 to stack 24 for release to the atmosphere.

In the most preferred processes, in units 20 and 22, the exhaust gas is compressed to 100–450 psi (6.9–31 bars) and cooled to condense $SO_2$; and then may be further cooled to about −30° F. (−34° C.) for storage, where any $N_2$ or $O_2$ contained in the $CO_2$ will boil off to be vented. Stored liquid $CO_2$ and also liquid $SO_2$ are available for refrigeration duty to cool an intermediate refrigerant which in turn may be used to cool plant condensers and heat exchangers.

The exhaust gas polishing steps including blower 18 and the compressor would need to have less than 10% of the mass flow capacity of a comparable size air-fired boiler due to the following factors: treatment of a much-reduced volume of cool gas, at ambient temperature, versus hot flue gas at 200–450° F. (93–232° C.); reduced fuel consumption further reduces both combustion gas and exhaust gas flows; about 1% excess $O_2$ is substituted for 15–20% or more excess air; and higher density/higher heat capacity $CO_2$ replaces $N_2$ and water vapor as the recycled diluent in the combustion gas so that the final product to be treated is >95% $CO_2$.

The $O_2/CO_2$ combustion method and apparatus of this embodiment may embody additional ducts and blowers depending on the choice of boiler fuel and preferred operating technique. Solid fuels are preferably pulverized, crushed or shredded. This closed-cycle system desirably employs recycled gas to blow fuel into the boiler to exclude blowing with air, with its nitrogen content, which would reduce boiler efficiency. FIG. 3 shows a blower 27 which would connect to a duct, not shown, to carry a controlled amount of exhaust gas through the GPS via a duct 36 (see FIG. 4) for heating to 500–750° F. (260–399° C.) and then through an insulated duct, not shown, paralleling combustion gas duct 6, to the location of a pulverizer or crusher or shredder, not shown, from where such hot gas blows is heated fuel into the boiler.

A blower 28 may also be provided to move exhaust gas through a duct, not shown, leading to the GPS 4 to provide upper boiler exhaust gas attemperation as a means to avoid ash fusion temperatures above about 2200° F. (1204° C.). By this means, upper boiler and convective zone temperatures can be maintained at about 2000° F. (1093° C.) to prevent efficiency-limiting particulate accumulations on the radiant and convective heat transfer tubing surfaces. This duct may also be routed through the GPS (see duct 37 in FIG. 4) if it is preferred to utilize hot exhaust gas, largely $CO_2$, for attemperation at 500–750° F. (260–399°). Or alternatively, ambient temperature exhaust gas can be routed through blower 28 through a duct, not shown, without preheating for injection into the upper boiler area. In either instance, this attemperation gas stream preferably contains less than 1% moisture. Preferably attemperation is controlled by a VSD blower using exhaust gas containing mostly $CO_2$ and generally more than 95% $CO_2$.

A flexible and readily variable method of operating the $O_2/CO_2$ combustion processes of this invention takes advantage of a simplified and preferred operating scheme utilizing variable speed drive (VSD) motors for the key blowers in the system, namely blowers 10, 18, 27, 28 and 38, to achieve precise management from a single control point. As earlier indicated, overall management of the character of the combustion gas stream preferably achieves a relatively low velocity exhaust gas stream, e.g. 20 to 30 fps, through the boiler. Particulate vacuum pumps, water and other pumps are controlled separately.

System pressures for the preferred operating methods of this invention will be low, from a few pounds through the boiler radiant heat zone 2 and gradually reducing to a slight vacuum in cooling region 13 of the GPS as the outflowing exhaust gas cools and moisture condenses. Boiler radiation zone 2 pressure may be 2 to 50 psi (0.13 to 3.3 bar) but will preferably be maintained in the range of 5 to 15 psi (0.3 to 1.0 bar). Pressure is controlled by adjusting the speeds of blowers 10 and 18.

FIG. 4 shows a cross-section of the ducts in the upper section of the GPS 4 at, for example, point A on FIG. 3. This cross-sectional view shows a large duct to transport combustion gas to the boiler. Small ducts 36 and 37 have been discussed is above. A bottom plate 30 in the outer duct is made of perforated superaustenitic stainless steel and allows passage of settled particulate. When vacuum pumps/blowers 31 are activated, particulate passes through ducts 29 to exit the GPS; operation may be intermittent, as needed. Such particulate and hot gas passes into ash separation units 32, which may be placed about every 10 to 15 feet (3.3–4.6 m) along the horizontal upper zone of the GPS 4. Filters 33 collect particulate, and hot exhaust gas is blown back through lines 34. This blow-back gas force acts to dislodge particulate which may accumulate on duct 5 and on the boiler feedwater heating tubing 3. Reverse pulse operation of blowers/pumps 31 cleans filters 33, and the particulate drops through lines 35 for recovery.

Table 1 cites data related to underlying causes of poor efficiency in Rankine cycle air-fired combustion systems, which problems are largely overcome in a closed single-cycle $O_2/CO_2$ combustion method (5). Water vapor has a low specific gravity/low density compared to $CO_2$. The heat capacity of $CO_2$ is 2.44 times the sensible heat capacity of $H_2O$ as water vapor by molecular weight. The high water vapor in (3) and (4) causes large latent heat losses, 970 Btu/lb (540 cal/g) $H_2O$, in addition to the sensible heat losses which are found by measuring the exhaust gas mass flow at the air heater outlet where temperatures are typically 300° F. (149° C.) or more. The sensible heat loss is 1.0 Btu/lb-° F. for $H_2O$, 1.56 Btu/lb-° F. for $N_2$ and 2.44 Btu/lb-° F. for $CO_2$ (4.15 kJ/kg-° C. for $H_2O$, 6.48 kJ/kg-° C. for $N_2$ and 10.14 kJ/kg-° C. for $CO_2$) at atmospheric pressure and system mini-mum temperatures, in accordance with the molecular weights and specific gravities in Table 1. The latent and sensible heats are unavailable for steam generation in (3). Latent heat is not recovered in (4) but sensible heat is partially recovered. Both latent and sensible heats are largely recoverable in (5). The low density of water vapor causes high velocity and therefore poor heat transfer. The gas space requirement of water vapor compared to $CO_2$ is 21 ÷8.59 (1) or 2.44 times $CO_2$. $N_2$ in (3) adversely affects velocity compared to (4) and (5). Maximum use of $CO_2$ with minimum water vapor and $N_2$ in (5) minimizes volume and space velocity for the best heat transfer results in both the exhaust gas and the recycled combustion gas.

A sulfur removal alternative to condensing $SO_2$ in the unit 20 is the is injection of calcium oxide (CaO) or other alkaline sorbents dissolved in water to react with $SO_2$ to form salts, which is a well-known flue gas scrubbing method. Injection may be by spraying the solution into the GPS 4 at the top of the vertical section. The falling alkaline mist will absorb and precipitate the salts at exhaust gas temperatures decreasing from about 200° F. (93° C.) at the top to about 70° F. (21° C.) at the bottom in a low exhaust gas velocity of 10 to 15 fps (3.3–4.6 mps). Further condensation occurs in the cooling region 13 where the exhaust gas temperature is reduced to about 40° F. (4° C.) with a <1% moisture content. The final exhaust gas will contain only trace amounts of $SO_2$ and any formed acids. Therefore the exhaust gas may be safely vented without utilizing the compression and cleanup methods of unit 20. This alternative method may be employed during any interruption of the processes in unit 20. Also it may be utilized continuously when burning low-sulfur fuels. For example, most coals in Montana and Wyoming in the western United States, and also many lignites, contain natural $SO_2$ sorbents and only 0.25% to 0.50% sulfur, and this method may satisfactorily replace unit 20 when there is low $SO_2$ content, the recovery of which would have insignificant commercial value. The drawback to this removal method is reduced efficiency due to the injected water spray which greatly reduces sensible heat recovery and mostly eliminates the possibility of latent heat recovery. Also the volume of solid wastes to be disposed of is increased.

There has been disclosed herein a method for operating a boiler together with an apparatus integrated with the boiler to achieve significant efficiency improvement with reduced emissions. The invention has been described and illustrated by specific embodiments but is not to be so limited. Those skilled in the art will understand that variations and modifications can be made without departing from the spirit of the invention, and it is intended that such variations and modifications shall be considered to be within the scope of the appended claims and equivalents thereof.

What is claimed is:

1. A Rankine cycle steam generator system which system comprises:
a boiler having a fuel combustion zone and radiant heat and convective heat transfer zones for producing steam;
an insulated Gas Primer Sector (GPS) combined with the boiler so that an exhaust gas stream therefrom flows through the GPS;
the GPS including means for removing particulate from the exhaust gas stream and means for transferring heat to a combustion gas stream by indirect counterflow heat exchange with the exhaust gas stream over an extended residence time, the result of which heat transfer is the reduction of the temperature of the exhaust gas stream to a temperature where moisture condenses;
means for supplying said combustion gas stream to the GPS where it is heated in indirect counterflow heat exchange with the exhaust gas stream over an extended residence time to reach a temperature of at least about 500° F. (260° C.);
insulated duct means for conveying the heated combustion gas stream exiting the GPS to the boiler combustion zone for fuel combustion therein; and
means for removing particulate from the GPS.

2. The system according to claim 1 wherein the combustion gas stream being heated in the GPS is (a) air, (b) oxygen-enriched air, (c) a mixture of oxygen-enriched air and recycled exhaust gas, or (d) a mixture of oxygen and recycled exhaust gas.

3. The system according to claim 2 wherein the combustion gas stream is a mixture of oxygen-enriched air and recycled exhaust gas, or a mixture of $O_2$ and recycled exhaust gas, and wherein variable speed drive (VSD) blowers are provided and used to control the mass flow and the proportions of the constituents, combined to make up the combustion gas, to maintain the preferred boiler combustion temperature and the combustion gas velocity.

4. The system according to claim 1 wherein the GPS includes an elongated insulated exterior duct which surrounds an elongated interior duct into which the combustion gas stream is supplied for said counterflow.

5. The system according to claim 4 wherein the exterior duct has an insulation efficiency greater than 90%.

6. The system according to claim 4 wherein the elongated interior duct is generally coaxial with the exterior duct and has a sloped upper surface to deter the accumulation of particulate.

7. The system according to claim 4 wherein the exterior duct contains a horizontal perforated bottom metal plate for removing particulate.

8. The system according to claim 7 wherein the means to remove particulate from the GPS uses vacuum filters with hot gas blowback into the upper region of the GPS.

9. A Rankine cycle steam generator system which system comprises:
a boiler having a fuel combustion zone and radiant heat and convective heat transfer zones for producing steam;
an insulated Gas Primer Sector (GPS) combined with the boiler so that an exhaust gas stream therefrom flows through the GPS;
said GPS including means for removing particulate from the exhaust gas stream and means for transferring heat to a combustion gas stream that includes oxygen and mostly $CO_2$ by indirect counterflow heat exchange with the exhaust gas stream over an extended residence time, as a result of which heat transfer the temperature of the exhaust gas stream is reduced to near ambient or lower so that moisture condenses;
means for further cooling the exhaust gas stream to between about 32 and 50° F. (0–10° C.);
means for separating the further cooled exhaust gas stream into a first major portion and a second portion;
means for combining said first portion with $O_2$ to form the combustion gas stream and for supplying same to the GPS where it is heated in indirect counterflow heat exchange with the exhaust gas stream over an extended residence time to reach a temperature of at least about 500° F. (260° C.);
insulated duct means for conveying the heated combustion gas stream exiting the GPS to the boiler combustion zone for fuel combustion therein; and
means for removing particulate from said GPS.

10. The system according to claim 9 wherein the GPS includes an upstream section, a downwardly extending intermediate section and a lower downstream section, and wherein the means for further cooling is associated with said downstream section, and whereby as a result of cooling and condensation of moisture, the exhaust gas stream volume decreases so that its velocity is reduced to about 10 feet per second (3.3 mps) or less.

11. The system according to claim 10 wherein the GPS includes an elongated insulated exterior duct having an insulation efficiency of greater than 90% which surrounds an elongated interior duct into which said combustion gas stream is supplied for said counterflow.

12. The system according to claim 9 wherein:
said further cooling means is operated to cool the exhaust gas stream to about 40° F. (4° C.) or lower;
the GPS is designed to heat the combustion gas stream to at least about 700° F. (371° C.);
means is provided to continuously control the mass flow and the proportions of oxygen and mostly $CO_2$ in the combustion gas stream to optimize boiler temperature and combustion gas velocity;
means is provided to supply heated mostly moisture-free exhaust gas ducted through the GPS to blow pulverized or crushed or shredded fuels into the boiler; and
means is provided to control upper boiler temperature by attemperation with exhaust gas having less than 1% moisture.

13. The system according to claim 9 which also includes means to continuously control the mass flow and the proportions of $O_2$ and mostly $CO_2$ in the combustion gas stream by variable speed drive (VSD) blowers to optimize boiler temperature and velocity;
means to supply largely moisture-free exhaust gas which has been ducted through the GPS to blow pulverized, crushed or shredded fuels into the boiler combustion zone; and
means for controlling upper boiler zone temperature by attemperation by a VSD blower using exhaust gas containing mostly $CO_2$ and generally more than 95% $CO_2$.

14. A method for operating a Rankine cycle steam generator system which system includes a boiler having a fuel combustion zone and radiant heat and convective heat transfer zones for producing steam, and an insulated Gas Primer Sector (GPS) combined with the boiler so that an exhaust gas stream therefrom flows through the GPS and wherein a combustion gas stream flows in a counterflow direction therewithin, said method comprising transferring heat to the combustion gas stream by indirect counterflow heat exchange with the exhaust gas stream over an extended residence time within the GPS, as a result of which heat transfer the temperature of the exhaust gas stream is reduced to near ambient or lower so that moisture condenses;

removing particulate from the exhaust gas stream in the GPS;

further cooling the exhaust gas stream to between 32 to 50° F. (0–10° C.) to condense additional moisture;

separating the further cooled exhaust gas stream into a first major portion and a second portion;

combining the first portion with $O_2$ to form a combustion gas stream containing $O_2$ and mostly $CO_2$ and supplying same to the GPS where it is heated in indirect counterflow heat exchange with the exhaust gas stream over an extended residence time so that it reaches a high temperature of at least about 500° F. (260° C.);

conveying the high temperature combustion gas stream from the GPS through an insulated duct to the boiler combustion zone for fuel combustion therein and removing particulate from the GPS.

15. The method according to claim 14 wherein the particulate is removed from the exhaust gas stream and from the GPS by gravity and by intermittent use of vacuum filters with hot gas blowback into the GPS.

16. The method according to claim 14 wherein the residence time of said outflowing exhaust gas stream through the GPS is at least 15 seconds.

17. The method according to claim 14 wherein the GPS includes an upstream section, a downwardly extending intermediate section and a lower downstream section, and wherein said further cooling takes place in the lower downstream section where exhaust gas velocity is reduced to 10 feet per second (3.3 mps) or less and the moisture content of the exhaust gas is reduced to about 1% or less.

18. The method according to claim 14 wherein the gases measured at the boiler exit have a velocity of about 30 feet per second or less.

19. The method according to claim 14 wherein the oxygen level in said combustion gas stream is controlled to maintain oxygen in the fuel combustion zone in no greater than a 3% excess of the stoichiometric fuel combustion requirement.

20. The method according to claim 14 wherein:

the mass flow and proportions of oxygen and mostly $CO_2$ in the combustion gas stream are continuously controlled by the use of variable speed blowers to optimize boiler temperature and combustion gas velocity;

a heated stream of exhaust gas having not greater than about 1% moisture is supplied through the GPS and used to blow pulverized, crushed or shredded fuel into the boiler combustion zone; and upper boiler temperature is controlled by attemperation with exhaust gas having a moisture level not greater than about 1%.

21. The method according to claim 14 wherein the residence time of said outflowing exhaust gas stream through the GPS is about 30 seconds or more.

* * * * *